March 22, 1960
J. F. BELL
2,929,242
METHOD FOR DETERMINING STRAIN
Filed March 11, 1957
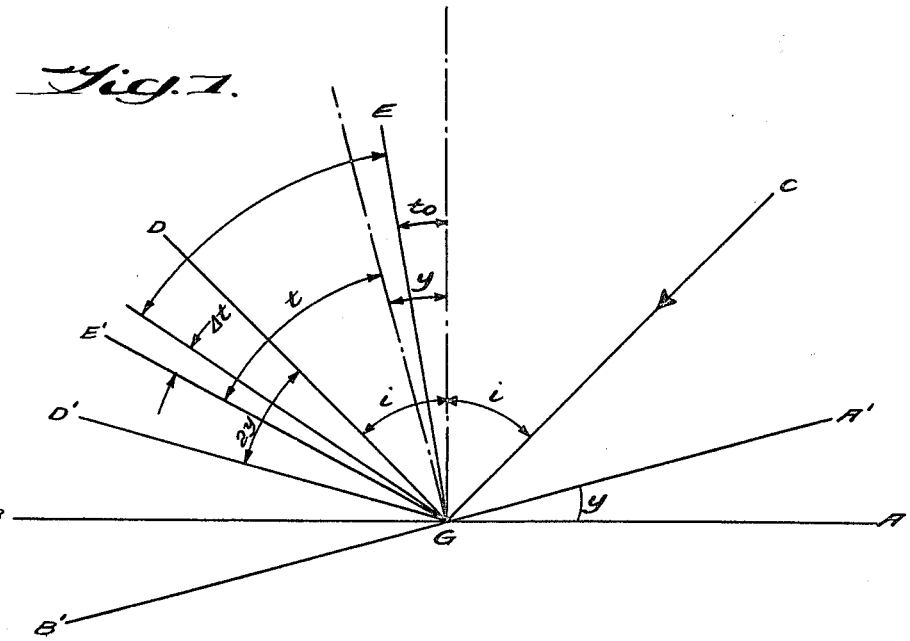
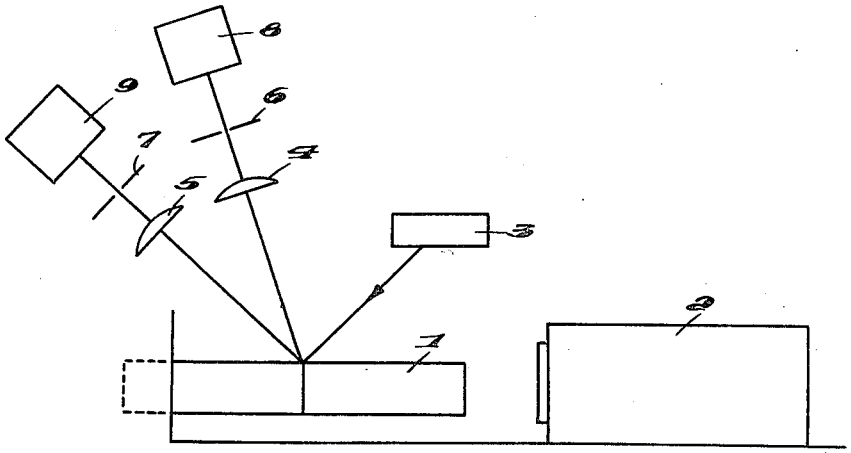
INVENTOR
JAMES F. BELL,
BY Lawson and Taylor
ATTORNEYS

United States Patent Office 2,929,242
Patented Mar. 22, 1960

2,929,242

METHOD FOR DETERMINING STRAIN

James F. Bell, Baltimore, Md., assignor to Marvalaud, Incorporated, Westminster, Md., a corporation of Maryland Application March 11, 1957, Serial No. 645,050

3 Claims. (Cl. 73—88)

This invention relates to a method for determining strain in solids. More specifically, the invention relates to a method and apparatus for determining the strain, slope of surface and linear displacement of a member through the measurement of movement of the diffracted and central images from a diffraction grating.

The use of strain gauges is quite well known. One of the most common types of gauges is a resistance wire gauge in which a resistance wire is embedded in a material glued to the surface of the structural member. Variations in strain in the structural element produce corresponding variations in the resistance of the wire and thus means is provided for determining the degree of strain. The disadvantages in such gauges are well recognized. It is necessary to provide a gauge of sufficient length so that measurable resistance changes are obtained and furthermore the top limit of strain of the structural member is determined by the strength of the glue used to secure the strain gauge to the structural member. The present invention is designed to overcome many of these disadvantages and yet provide a gauge which will determine the larger strains with a higher degree of accuracy than has been possible heretofore.

The present invention contemplates the provision of a diffraction grating on the member undergoing tests. The angle of diffraction for a diffraction grating is dependent upon the number of lines per inch of the grating. When strained, the number of lines per inch changes and thus the angle of diffraction shifts. A source of light is provided adjacent this diffraction grating and light is reflected and diffracted from the grating through a V-shaped slit in a plate disposed between the diffraction grating and a photomultiplier tube. Photomultipliers and an associated electrical circuit will measure and record the intensity of one order of the light diffracted and reflected from the grating. The intensity of the light which is diffracted and reflected as measured through the V-shaped slit is a measurement of the angles of diffraction and reflection. The structural element is then loaded and a second measurement of the reflected and diffracted images is made. Strain in the specimen will cause a change in the number of lines per inch in the grating and hence will cause a corresponding change in the angle of diffraction. The angle of reflection will not, of course, be affected by a variation in the number of lines in the grating but loading of the structural member will produce an angular variation in the surface of the member and thus the change in the angle of reflection is a measurement of this angular variation in the specimen surface. It is also possible according to the presently described method to measure longitudinal displacement of the structural member.

It is possible with the presently described method and apparatus to make either dynamic or static determinations of plastic strains in solids. A gauge length of a few thousandths of an inch has been used to measure strains up to eight percent total load.

Still another object of the present invention is to provide a method for determining strain in which the variation in the angle of diffraction from a diffraction grating is measured.

Other objects and many of the attendant advantages of the present invention will become apparent upon consideration of the following detailed description taken in connection with the accompanying drawing wherein:

Fig. 1 is a diagram showing the basic concept of the present invention; and

Fig. 2 is a block diagram of the apparatus utilized in carrying out the method.

Referring now to Fig. 1 the line A—B represents the specimen surface initially. The incident light is represented by the line CG, the point G denoting the location of the grating on the specimen surface. The line GD represents the reflected image and it is obvious that the angles $i$ are equal. The diffracted image is represented by the line GE. Under load the specimen surface will be distorted angularly to position A'B' through an angle $y$. The reflected image will be moved through an angle $2y$ to a position represented by line D'G. The diffracted image will be shifted to a position represented by E'G and this line is at an angle $t$ to the line normal to the plane of the surface. If the angle $t_0$ represents the initial angle of diffraction and $\Delta t$ is the change in the diffraction angle produced by the strain, it can be seen that the total angular motion of the diffracted image is $t+y-t_0-\Delta t$.

The diffraction grating is located in a uniform light field, and a cylindrical lens is used to focus the diffracted image on a V-shaped slit so that the displacement $d$ along the V slit produced by the angular motion is $$d = f(t+y-t_0-\Delta t)$$

where $f$ is the focal length of the cylindrical lens.

The light intensity upon the photo-multiplier tube is directly proportional to the length of the image upon the V-shaped slit interposed between the diffraction grating and the photo-multiplier tube. After a displacement $d$, we have $i_d/I_d = d/b$ where $i_d$ is the change in intensity from the displacement $d$ and $I_d$ is the total intensity at the initial position and $b$ is the distance from the end of the slit to the initial position.

Thus, it is seen that for the diffracted image the equation $t+y-t_0-\Delta t = -(b/f)(i_d/I_d)$ applies.

As is seen in Fig. 1, the change in the angle of the central image is twice that of the angle $y$ since the direction of the incident light is fixed. For the central image $2y = (b/f)(i_c/I_c)$ where $i_c$ is the change in intensity from the motion of the reflected image on a V-shaped slit while $I_c$ represents the initial total intensity of the central image before stress. Both V slits are located so that increasing angles give a decreasing intensity. $I_d$ and $I_c$ are determined by using rectangular slits and thus any variation in either total intensity may be measured during strain by substituting the rectangular slit for the V-shaped slit.

Where $n$ is the spectral order, $x$ the wave length of light and $m$ the number of lines per inch in the grating, $e = \cos t \cdot \Delta t / nxm$ and $$e = (\cos t/nxm)[t-t_0+(b/f)(i_d/I_d-i_c/2I_c)]$$

where $e$ is the strain.

From the foregoing, it is apparent that the strain may be determined by measurements of the diffraction angles both before and after strain. The angular displacement of the surface is readily determined from the change in the angle of reflection.

In Fig. 2 there is shown an apparaus which may be utilized in the determination of strain. At 1 there is shown a specimen which is subjected to impact by weight 2. The source of light is shown at 3 and the diffracted and reflected images pass through lenses 4 and 5 respectively, V-shaped slits 6 and 7 and the light intensity is measured by photo-multiplier tubes 8 and 9.

The light beam is focused on the diffraction grating and is reflected and diffracted through the lenses 5 and 4 respectively. The line of light reflected is at a given position on the V slit 7 which will constitute a light of a certain intensity, producing a response in the photo-multiplier. This response can be determined by any convenient means such as, for example, an oscilloscope. Similarly, the diffracted image will constitute a line of light the intensity of which on the V slit 6 will be measured by photo-multiplier 8. The specimen is then put under strain by mass 2 which is arranged on a track so that it may be given a predetermined velocity toward the end of the specimen. The strain in the specimen will produce a variation in the number of lines in the diffraction grating and this will move the line of light in the V slit 6 and the variation in the intensity measured by the photo-multiplier is an indication of the degree of movement. The reflected image will be moved only by angular variations in the surface of the specimen and as brought out hereinbefore the angle through which the reflected image moves is twice the angle through which the surface moves.

It is within the purview of this invention to provide a punch or the like having a grating on the face thereof whereby a diffraction grating can be readily imprinted on any structural members. An optical system mounted in a portable unit could be provided so that strain measurements could be made after the structure is assembled. Measurements could be made at various times during the life of the structure so that the exact strain will always be known.

It is apparent that the drawing and description given herein constitute one embodiment of the inventive concept. Any order of diffracted or reflected images may be measured and, for example, the incident light may be focused normally to the specimen surface and the angles of diffraction on both sides of the incident light path measured.

Obviously, many modifications and variations of the present invention may be made in the light of the above teachings.

What is claimed as new and desired to be secured by Letters Patent is:

1. A method for determining the strain in a member comprising providing a diffraction grating on the member, focusing light on the grating and measuring the angle of diffraction before and after stressing the member.

2. A method for determining the degree of strain of a specimen comprising the steps of imprinting a diffraction grating on the specimen, focusing a light beam on the grating, measuring the initial angle of diffraction, stressing the specimen and measuring the angle of diffraction of the stressed specimen.

3. In a process of the class described, the steps of impressing a diffraction grating in a structural member, measuring the angles of diffraction and reflection of the grating from a light source when the member is unstressed, measuring the angles of diffraction and reflection of the grating when the member is stressed, the change in the angle of diffraction being a function of strain in the member and the change in the angle of reflection being a function of the angular movement of the member.

References Cited in the file of this patent

UNITED STATES PATENTS

| | | |
|---|---|---|
| 1,552,450 | Roach | Sept. 8, 1925 |
| 1,711,347 | Harter | Apr. 30, 1929 |
| 2,067,262 | Demontvignier et al. | Jan. 12, 1937 |
| 2,444,442 | Herbold | July 6, 1948 |
| 2,446,628 | Brown | Aug. 10, 1948 |
| 2,540,105 | Dunbar et al. | Feb. 6, 1951 |
| 2,737,077 | Sholl | Mar. 6, 1956 |
| 2,787,834 | Shoup | Apr. 9, 1957 |